(12) United States Patent
Wang et al.

(10) Patent No.: US 10,628,867 B2
(45) Date of Patent: Apr. 21, 2020

(54) SYSTEM OF FURNITURE DESIGN BY A CONSUMER THROUGH INTERNET

(71) Applicants: George Wang, City of Industry, CA (US); Rocky Young, City of Industry, CA (US)

(72) Inventors: George Wang, City of Industry, CA (US); Rocky Young, City of Industry, CA (US)

(73) Assignee: Furniture of America, Inc., City of Industry, CA (US)

( * ) Notice: Subject to any disclaimer, the term of this patent is extended or adjusted under 35 U.S.C. 154(b) by 883 days.

(21) Appl. No.: 14/260,245

(22) Filed: Apr. 23, 2014

(65) Prior Publication Data

US 2015/0310518 A1    Oct. 29, 2015

(51) Int. Cl.
*G06Q 30/00* (2012.01)
*A47B 96/20* (2006.01)
*G06Q 30/06* (2012.01)

(52) U.S. Cl.
CPC ......... *G06Q 30/0621* (2013.01); *A47B 96/20* (2013.01)

(58) Field of Classification Search
CPC .................................................. G06Q 30/0621
USPC ........................................................ 705/26.5
See application file for complete search history.

(56) References Cited

U.S. PATENT DOCUMENTS

| | | | | |
|---|---|---|---|---|
| 5,176,435 A * | 1/1993 | Pipkens | ................. | A47B 17/00 312/204 |
| 2003/0172003 A1 * | 9/2003 | Holbrook | ........... | G06Q 30/0601 705/26.1 |
| 2004/0067796 A1 * | 4/2004 | Murrey | ................. | A63D 15/00 473/4 |
| 2005/0027553 A1 * | 2/2005 | Samet | ................. | A47C 31/126 705/26.1 |
| 2007/0203609 A1 * | 8/2007 | DeCastro | ................. | D05C 5/00 700/138 |

(Continued)

OTHER PUBLICATIONS

DreamSeat Launches Online Business Contest; Win Customized Logo Office Furniture, Feb. 29, 2012, PR Newswire Association LLC (Year: 2012).*

(Continued)

*Primary Examiner* — Brittney N Miller
(74) *Attorney, Agent, or Firm* — Raymond Y. Chan; David and Raymond Patent Firm

(57) ABSTRACT

A method of design an article of furniture by consumer includes the steps of: providing a furniture customizing platform that the consumer is able to access the furniture customizing platform via an electronic device through Internet, selecting different barebone components to customize a furniture product on the furniture customizing platform; selecting different decorative elements for the furniture product, and generating a preview of a virtual furniture product with the selected decorative element. The decorative elements are interchangeably and selectively added-on to the furniture product to change an overall ornament design of the furniture product without disassembling the furniture product. Therefore, the customer is able to immediately change ornamental design of the furniture product by the decorative element without affecting the main structure of the furniture product.

5 Claims, 15 Drawing Sheets

(56) References Cited

U.S. PATENT DOCUMENTS

| | | | | |
|---|---|---|---|---|
| 2012/0123897 A1* | 5/2012 | Gargiulo | ............ | G06Q 30/0621 |
| | | | | 705/26.5 |
| 2013/0090894 A1* | 4/2013 | Dikerman | .............. | G06Q 30/00 |
| | | | | 703/1 |
| 2013/0205555 A1* | 8/2013 | George | .................. | A47C 31/11 |
| | | | | 29/91.1 |

OTHER PUBLICATIONS

SmartFurniture.com Broadsides the Furniture Industry with Lego-Like Design, Apr. 24, 2000, PR Newswire Association LLC (Year: 2000).*

* cited by examiner

SYSTEM OF FURNITURE DESIGN BY A CONSUMER THROUGH INTERNET

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an article of furniture, and more particularly to a system and method of furniture design, wherein the consumer is able to customize the components of the furniture through Internet for altering the overall ornamental appearance of furniture with desirably added features.

Description of Related Arts

Nowadays, people are highly aware of their living environment such that people devoted much enthusiasm for decorating their houses and offices. Furniture, such as table, desk, chair, and sofa, is essential item and is considered a form of decorative art. In addition to its original function, it can serve as a decorative purpose. Generally speaking, furniture is a durable and bulky item that when the furniture is placed in a particular area of a room, the furniture will not be moved or relocated. Therefore, the furniture must be seriously selected to match with the interior design of the room. In the existing market, there are different designs of furniture to match with personal preference and interior room design. In other words, people usually bought furniture which matches with the color or design as the interior environment of their rooms. In addition, furniture usually is configured with a one-piece structure to enhance the rigidity of the furniture and to provide a particular unique design for decoration. Sometimes, the furniture store provides pre-design service that the customer is able to design the furniture before the final product is made. Therefore, the customer is able to choose different colors or patterns for the furniture. For example the customer is able to choose a particular color for the tabletop and a crafting design for the table legs in order to form a table. However, the pre-designable furniture will keep its overall ornamental appearance after it is made.

With the advent of the Internet, life has suddenly become much faster. Information, business, and even entertainment are just a click of a mouse away. With the Internet has come the opportunity for greater stimulation, many furniture stores provides an online shopping center enabling the customer to select different components of the furniture. For example, the customer is able to choose different styles of tabletop matching with desirable table legs. Therefore, the furniture store will ship the selected components of the furniture to the customer for assembling. However, once the furniture is assembled, the customer will not able to change the overall ornamental appearance. In other words, similar to the pre-designable furniture, the user-designed furniture will not be able to upgrade in the future.

Even thought the customer is able to order another set of table legs as the replacement of the original table legs, the customer must disassemble the original table in order to replace the new table legs to the original tabletop. Accordingly, the assembling furniture comprises a plurality of detachable connectors for connecting different components together such that the customer is able to detach and replace some of the components. For example, the detachable connectors are used for connecting the tabletop with the table legs, such that the customer is able to replace the tabletop while the table legs are kept. However, the detachable connectors will weaken the rigidity of the furniture. The joints of the furniture via the detachable connectors will be loosen when the components of the furniture are repeatedly detached and re-attached. Meanwhile, the customer may need lots of time to assemble all the components together, which is less efficiency and time-consuming.

SUMMARY OF THE PRESENT INVENTION

The invention is advantageous in that it provides a system and method of furniture design, wherein the consumer is able to customize the components of the furniture through Internet for altering the overall ornamental appearance of furniture with desirably added features.

Another advantage of the invention is to provide a system and method of furniture design, which provides an interchangeable arrangement that the customer can immediately change ornamental design of the furniture without affecting the main structure of the furniture.

Another advantage of the invention is to provide a system and method of furniture design, wherein the customer is able to select a plurality of decorative elements having different kinds of designs and patterns for providing different ornamental designs.

Another advantage of the invention is to provide a system and method of furniture design, wherein the customer is able to detachably couple the decorative element with the main supporting frame of the furniture without dissembling the main supporting frame. In other words, the decorative element can be detachably coupled with the main supporting frame in a tool-less manner.

Another advantage of the invention is to provide a system and method of furniture design, wherein the customer is able to select a LED light arrangement at a non-utilizing surface of the furniture to provide an optimal light effect for adding decorating and illuminating functions of the furniture without occupying any utilizing surface thereof.

Another advantage of the invention is to provide a system and method of furniture design, wherein the customer is able to detachably couple the LED light arrangement to the furniture without disassembling the furniture, such that the customer is able to replace or interchange other LED light arrangements to provide different decorative and illuminating functions.

Another advantage of the invention is to provide a system and method of furniture design, wherein the furniture in the system does not require to alter its original structure design, so as to reduce the cost and save the time for changing the ornament design of the furniture.

Another advantage of the invention is to provide a system and method of furniture design, wherein no expensive or complicated structure is required to employ in the present invention in order to achieve the above mentioned objects. Therefore, the present invention successfully provides an economic and efficient solution for providing a furniture designing platform for the customer to customize his or her own furniture.

Additional advantages and features of the invention will become apparent from the description which follows, and may be realized by means of the instrumentalities and combinations particular point out in the appended claims.

According to the present invention, the foregoing and other objects and advantages are attained by a method of design an article of furniture by consumer, comprising the following steps.

(A) Provide a furniture customizing platform that the consumer is able to access the furniture customizing platform via an electronic device through Internet.

(B) Select different barebone components, by the consumer, in a furniture component database to customize a furniture product on the furniture customizing platform.

(C) Select different decorative elements, by the consumer, in a furniture accessory database to interchangeably and selectively add-on to the furniture product on the furniture customizing platform, so as to change an overall ornament design of the furniture product without disassembling the furniture product.

(D) Generate a preview of a virtual furniture product with the selected decorative elements, via a computerized module, on the furniture customizing platform.

In accordance with another aspect of the invention, the present invention comprises a furniture designing system which comprises:

a furniture customizing platform for enabling a consumer to access via an electronic device through Internet;

a furniture component database, containing images of different barebone components, linked to the furniture customizing platform for enabling the customer to select the barebone components in order to customize a furniture product on the furniture customizing platform;

a furniture accessory database, containing images of different decorative elements, linked to the furniture customizing platform for enabling the customer to select, wherein the decorative elements are interchangeably and selectively added-on to the furniture product to change an overall ornament design of the furniture product without disassembling the furniture product; and a computerized module generating a preview of a virtual furniture product with the selected decorative elements on the furniture customizing platform.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
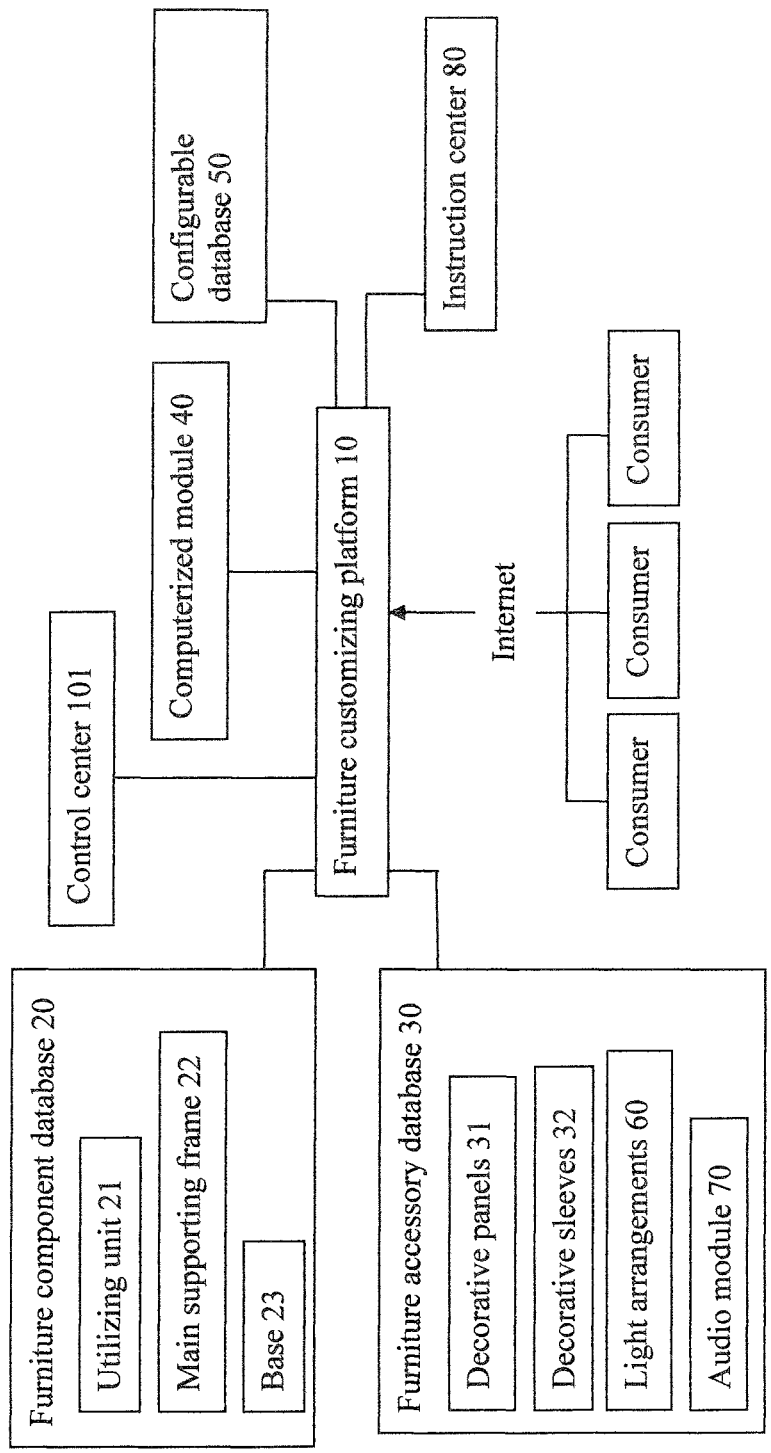
FIG. 1 is a block diagram illustrating a furniture designing system according to a preferred embodiment of the present invention.
Figure 2:
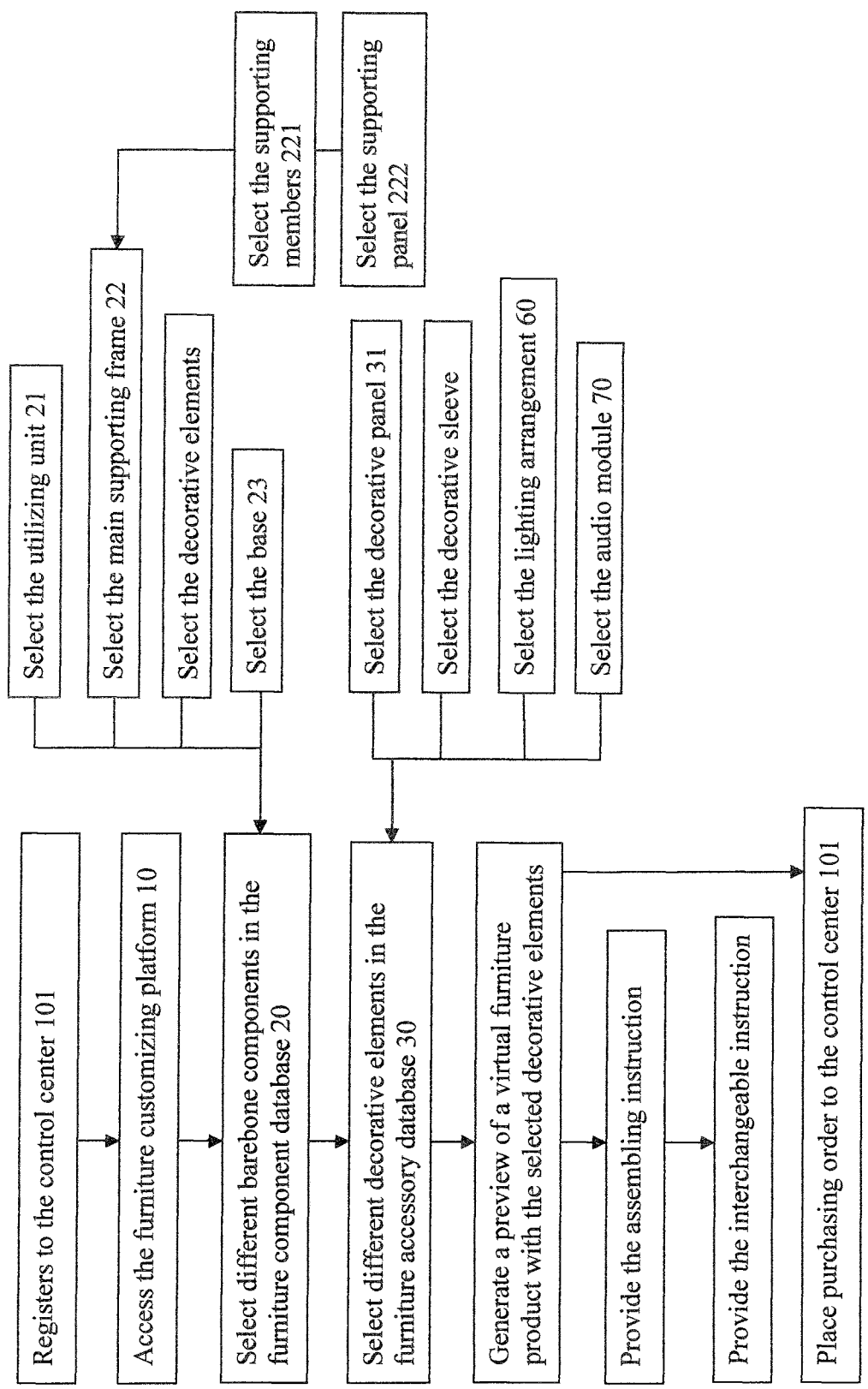
FIG. 2 is a flow diagram illustrating a method of design an article of furniture by consumer according to the above preferred embodiment of the present invention.
Figure 3:
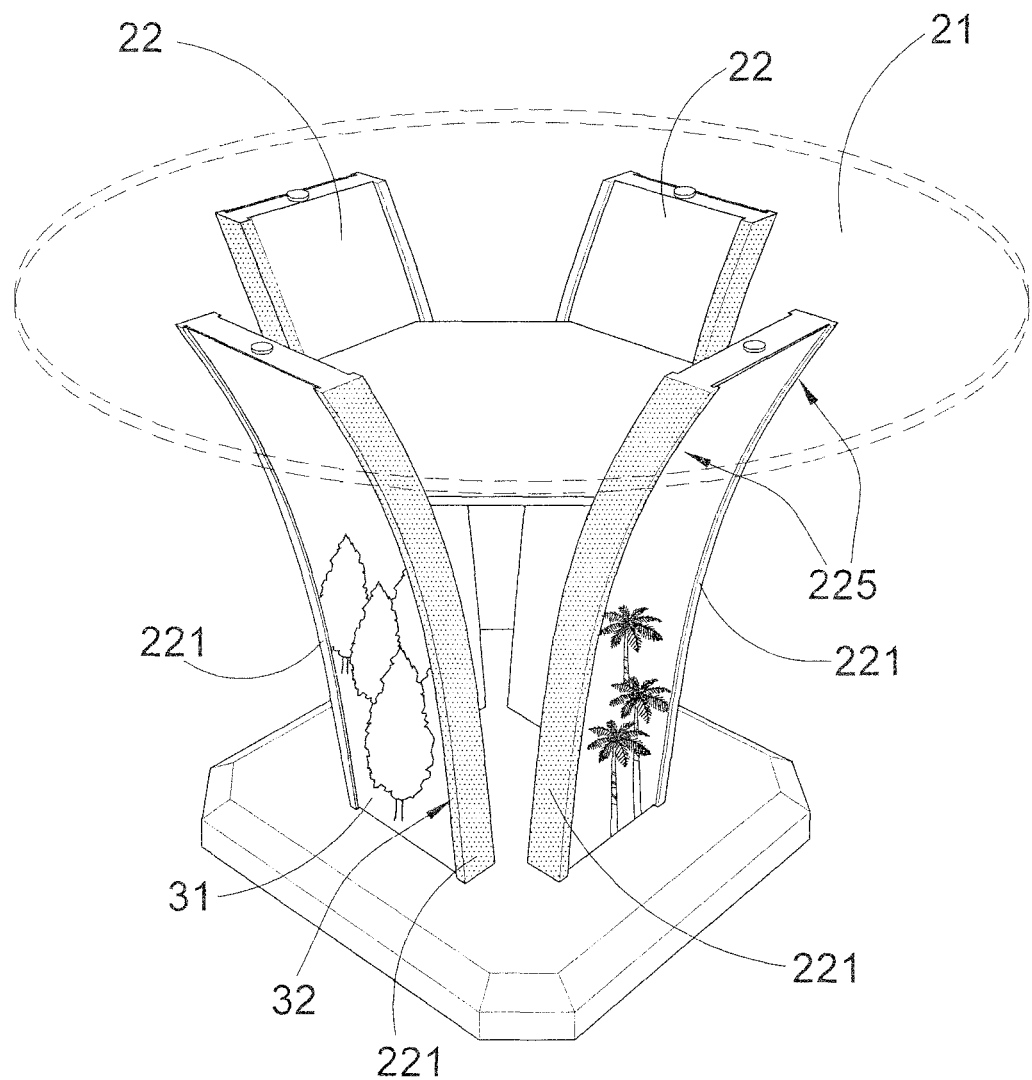
FIG. 3 is a perspective view of different barebone components of the furniture product according to the preferred embodiment of the present invention.

Referring to FIGS. 1 and 2 of the drawings, a method of design an article of furniture by consumer is illustrated, wherein the consumer is able to customize a furniture product and to immediately change ornamental design of the furniture product without affecting the main structure of the furniture product. The furniture designing system comprises a furniture customizing platform 10, a furniture component database 20, a furniture accessory database 30, and a computerized module 40. Accordingly, the method comprises the following steps.

(1) Provide the furniture customizing platform 10 that the consumer is able to access the furniture customizing platform 10 via an electronic device through Internet. Accordingly, the furniture customizing platform 10 is operatively linked to and operated by a control center 101 through a server of a furniture store and/or manufacturer, wherein the furniture customizing platform 10 can be a website that the consumers can access through the Internet, via a personal computer, mobile phone, or tablet computer, to conduct online design, shopping and purchasing.

(2) Select different barebone components, by the consumer, in the furniture component database 20 to customize the furniture product on the furniture customizing platform 10.

(3) Select different decorative elements, by the consumer, in the furniture accessory database 30 to interchangeably and selectively add-on to the furniture product on the furniture customizing platform 10, so as to change an overall ornament design of the furniture product without disassembling the furniture product.

(4) Generate a preview of a virtual furniture product with the selected decorative elements, via a computerized module, on the furniture customizing platform 10.

Accordingly, in the step (2), the barebone components are configured as images of the main components of the furniture product, wherein the barebone components are embodied to include a utilizing unit 21, a main supporting frame 22, and/or a base 23. As shown in FIGS. 3 to 6, the utilizing unit 21, the main supporting frame 22, and/or the base 23 are assembled to form the furniture product having a utilizing surface and a non-utilizing surface. The surfaces of the furniture product where the consumer normally touches and utilizes define as the utilizing surface and the surfaces of the furniture product where the consumer normally do not touch and utilize define as the non-utilizing surface. In particular, the non-utilizing surface of the furniture product will normally be unseen and will face toward the ground surface.

Figure 4:
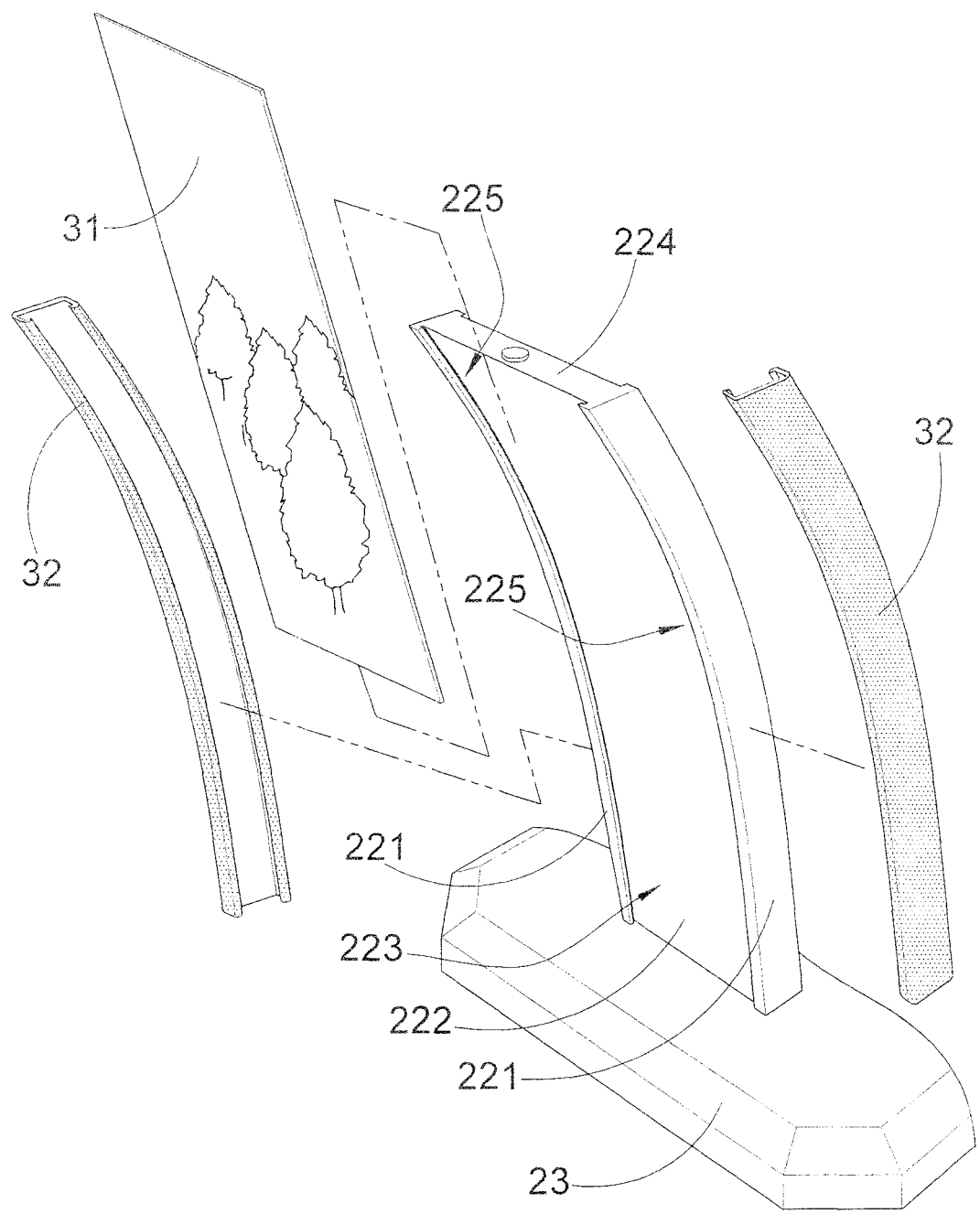
FIG. 4 is a perspective view of a main supporting frame incorporating with different decorative elements according to the above preferred embodiment of the present invention.
Figure 6:
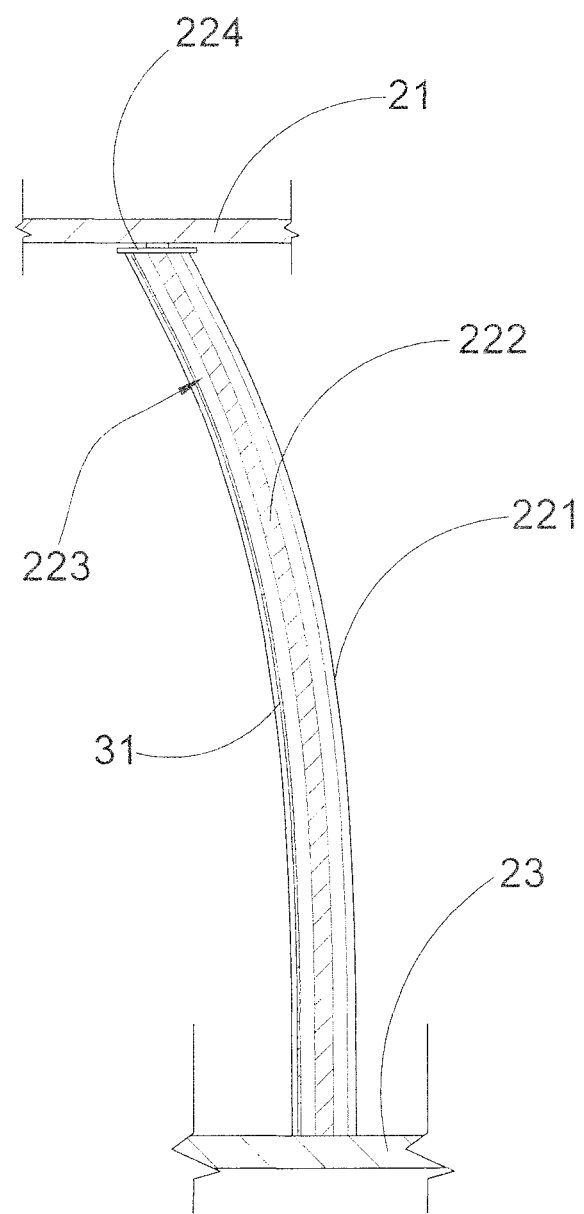
FIG. 6 is a sectional view of the main supporting frame incorporating with the decorative elements according to the above preferred embodiment of the present invention.

According to the preferred embodiment, the main supporting frame 22 comprises at least two supporting members 221 formed in pair to support the utilizing unit 21, and a plurality of supporting panels 222, as shown in FIGS. 4 and 6. Each of the supporting panels 222 is coupled between each pair of the supporting member 221 to define a decorative face 223 at the supporting panel 222. Accordingly, the two supporting members 211 in pair are symmetrical.

The step (2) further comprises the following steps.

(2.1) Select the utilizing unit 21 as one of the barebone components in the furniture component database 20.

(2.2) Select the main supporting frame 22 as one of the barebone components that supports the utilizing unit 21 to form the furniture product. The step (2.2) further comprises the following steps.

(2.2.1) Select a plurality of supporting members 221 in pair to form the main supporting frame 22. Accordingly, each pair of the supporting members 221 is parallel with each other and is extended in a curve configuration.

(2.2.2) Select at least one supporting panel 222 to be coupled between each pair of the supporting member 221 to define the decorative face 223 at the supporting panel 223. A thickness of each of the supporting panels 222 is smaller than a thickness of each of the supporting members 221. Therefore, when the supporting panel 222 is coupled between the two supporting members 221, the two supporting members 221 and the supporting panel 222 form a H-shaped cross sectional configuration. Accordingly, the supporting members 221 and the supporting panels 222 can be made of materials. For example, the supporting members 221 are made of wood and the supporting panels 222 are made of glass. Alternatively, the supporting members 221 and the supporting panels 222 can be made of materials, wherein the supporting members 221 and the supporting panels 222 are made of wood. Therefore, the supporting members 221 and the supporting panels 222 can be form in a one piece integrated structure.

Figure 5:
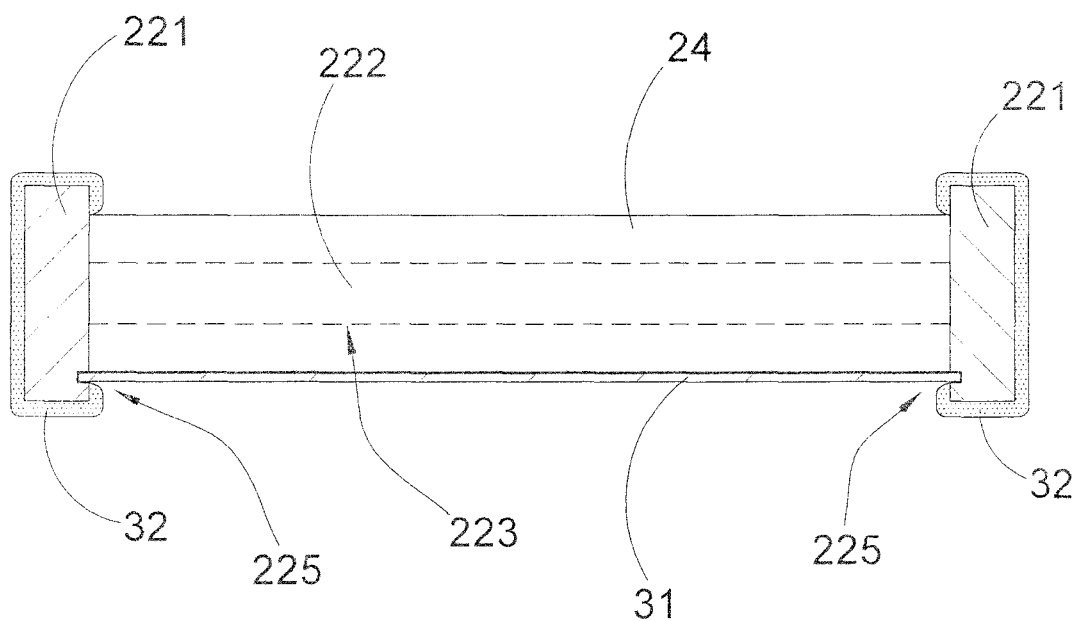
FIG. 5 a top view of the main supporting frame incorporating with the decorative elements according to the above preferred embodiment of the present invention.

The main supporting frame 22 further comprises a plurality of top supports 224, wherein each of the top supports 224 is extended between two top ends of the pair of the supporting members 221, as shown in FIGS. 4 and 5. A thickness of the top support 224 is larger than the thickness of the supporting panel 222 and is smaller than the thickness of the supporting member 221. In other words, the two supporting members 221 and the top support 224 also form a H-shaped cross sectional configuration. Preferably, the supporting members 221 and the top supports 224 are made of same material to enhance the rigidity of the main supporting frame 22 to support the utilizing unit 21.

(2.3) Select at least one of the decorative elements to be detachably coupled at the non-utilizing surface of the furniture product. In particular, the decorative elements are detachably overlapped at the decorative faces 223 of the supporting panels 222 respectively.

(2.4) Select the base 23 that the main supporting frame is upwardly extended from the base 23. It is worth mentioning that the step (2.4) is optional only if the furniture product has the base 23. Preferably, each pair of the supporting members 221 are curved outwardly from the base 23 to the top support 224, such that the upper ends of the supporting members 221 form an enlarged supporting area to support the utilizing unit 21.

For example, when the consumer selects a table, the images of different styles, sizes, and shapes of tabletops as the utilizing unit 21 are shown on the furniture customizing platform 10. The images of different styles, sizes, and shapes of leg frames as the main supporting frame 22 are shown on the furniture customizing platform 10. Therefore, the consumer is able to select one of the tabletops and one of the leg frames to form the table. The tabletop panel has a top surface serving as the utilizing surface and a bottom surface serving as the non-utilizing surface. Inner surfaces of the leg frames also serve as the non-utilizing surface.

It is worth mentioning that the utilizing unit 21, i.e. the tabletop, can be configured in different shapes. When the utilizing unit 21 is formed in a circular shape, four pairs of supporting members 221 are provided in a coaxial manner. When the utilizing unit 21 is formed in a rectangular shape, four pairs of supporting members 221 are provided in such a manner that two pairs of supporting members 221 are arranged to support at two longitudinal sides of the utilizing unit 21 respectively while another two pairs of supporting members 221 are arranged to support at two longitudinal sides of the utilizing unit 21 respectively.

It is worth mentioning that the tables are categorized into dining table, working desk, and the like, such that when one of the table categories are selected, the corresponding tabletops, leg frames, and/or base are filtered and shown on the furniture customizing platform 10.

Likewise, when the consumer selects a chair, the images of different styles, sizes, and shapes of sitting panels as the utilizing unit 21 are shown on the furniture customizing platform 10. The images of different styles, colors, sizes, and shapes of leg frames and/or back supporting frames as the main supporting frame 22 are shown on the furniture customizing platform 10. Therefore, the consumer is able to select one of the sitting panels and one of the leg frames and/or back supporting frames to form the chair. Different chair categories are provided for the consumer to select in order to display the corresponding sitting panels, the leg frames and/or back supporting frames on the furniture customizing platform 10. It is worth mentioning that the furniture product can be the table, chair, bed frame, sofa, desk, and the like to be constructed by the utilizing unit 21, the main supporting frame 22, and/or the base 23.

According to the preferred embodiment, the decorative elements are different decorative panels 31 with different designs and different decorative sleeves 32 with different colors, wherein the images thereof are stored in the furniture accessory database 30. Accordingly, the step (3) further comprises the following steps.

(3.1) Select at least one decorative panel 31 as one of the decorative elements to be detachably coupled at the non-utilizing surface of the furniture product. Accordingly, the decorative panel 31 is reusable and is made of flexible material to match with a curvature of the supporting member 221.

(3.2) Select at least one decorative sleeve 32 detachably enclosing each of the supporting members 221.

In the step (3), the consumer is able to select different interchangeable methods to couple the decorative elements at the decorative faces 223 of the supporting panels 222 respectively. The furniture designing system further comprises a configurable database 50 containing different interchangeable methods displayed on the furniture customizing platform 10, wherein said interchangeable methods are selected from the group consisting of a slidable attachment method, a magnetic engagement method, and a static cling method.

For the slidable attachment method, as shown in FIGS. 2 to 6, two side edge portions of the decorative panel 31 are slidably engaged with two sliding slots formed at inner sides of each pair of the supporting members 221 respectively, so as to couple the decorative panel 31 between the two supporting members 221.

Each pair of the supporting members 221 has two sliding slots 225 formed at inner sides thereof. Accordingly, the two sliding slots 225 of the supporting members 221 are facing toward each other. In other words, each sliding slot 225 is indently formed at the inner side of each of the supporting members 221. In particular, the sliding slots 225 are formed at the supporting members 221 in front of the supporting panels 222.

Each sliding slot 225 has a bottom opening formed at the bottom end of each of the supporting members 221 which is located at the base 23, and an upper opening formed at the upper end of each of the supporting members 221. The bottom opening of the sliding slot 225 is blocked by the base 23. Furthermore, the top opening of each of the sliding slots 225 is formed at the top end of the supporting member 221 at a position adjacent to the top support 224. In other words, the top opening of each of the sliding slots 225 will not be blocked by the top support 224. Each of the sliding slots 225 further has a side opening, wherein the side openings of the sliding slots 225 at the pair of supporting members 221 are facing toward each other.

In order to detachably attach the decorative panel 31 at the decorative face 223 of the supporting panel 222, each of the decorative panel 31 is slid at the sliding slots 225 to couple between the two supporting members 221 and to spacedly overlap on the decorative face 223 of the respective supporting panel 232. Accordingly, the decorative panel 31 is a thin panel preferably made of durable and flexible material such as plastic or metal. Each decorative panel 31 has its own design and/or decorative pattern, such that when the decorative panels 31 are coupled to the main supporting frame 22, the overall ornamental design of the furniture product will be changed. Therefore, two side edge portions of the decorative panel 31 are slidably engaged with the sliding slots 225 to couple the decorative panel 31 between the two supporting members 221. Since the decorative panel 31 is made of flexible material, the decorative panel 31 can be bent to match with a curvature of the supporting member 221 when the decorative panel is slidably engaged between the sliding slots 225.

Accordingly, the decorative pane 31 is slid to engage between the supporting members 221 from the top openings of the sliding slots 225 toward the bottom openings thereof. Since the bottom opening of the sliding slot 225 is blocked by the base 23, the decorative panel 31 is slid to engage with the sliding slots 225 from the top openings thereof and is blocked by the base 23. It is worth mentioning that the decorative panel 31 is extended between the side openings of the sliding slots 225 at the pair of supporting members 221. Each of the decorative panels 31 is encircled within the two supporting members 221, the base 23, and the utilizing unit 21.

Figure 9:
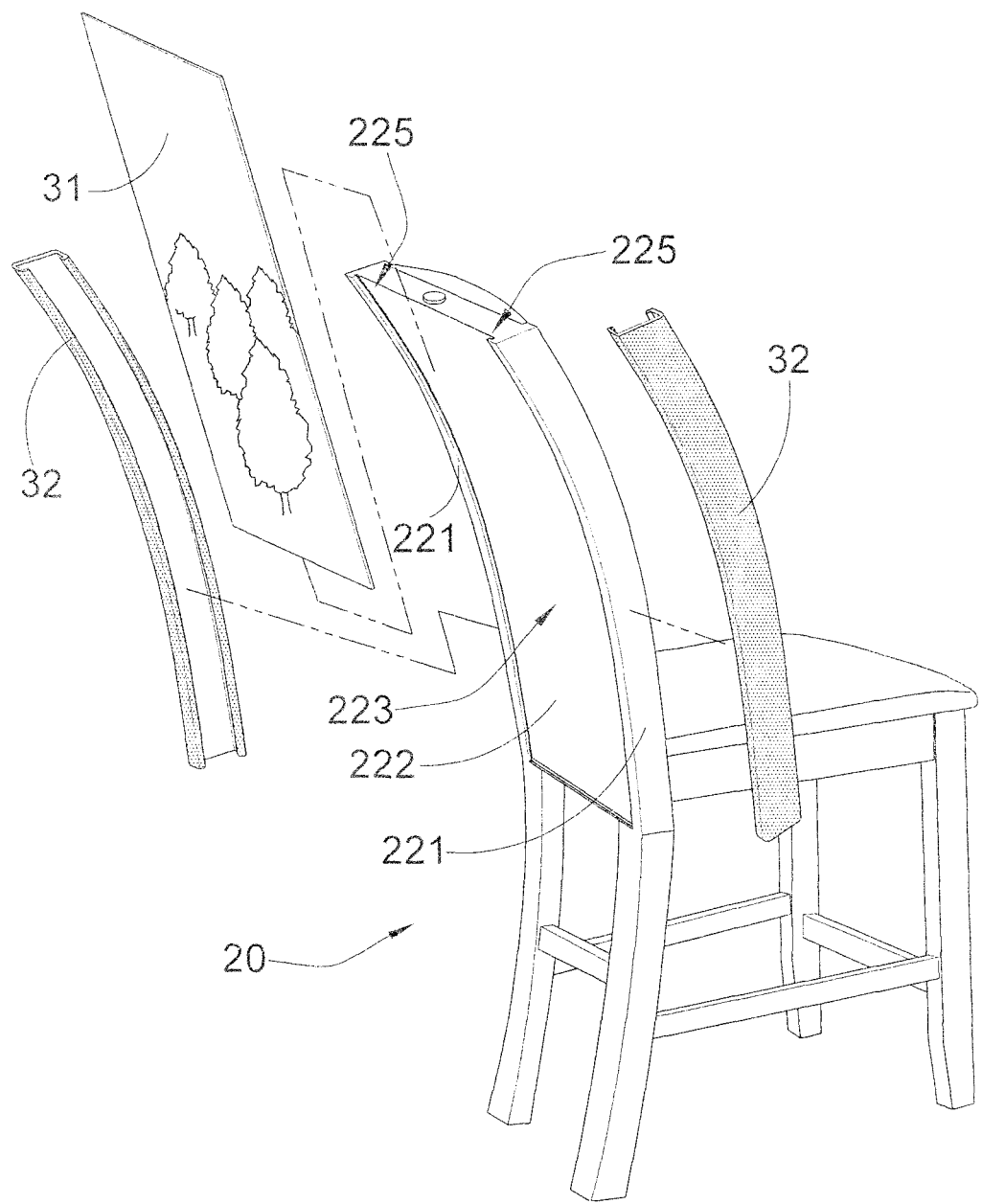
FIG. 9 illustrates the decorative element incorporating with the chair according to the above preferred embodiment of the present invention.

For chair configuration, as shown in FIG. 9, the two supporting members 221 form two side frames of the back supporting frame of the chair, wherein the supporting panel 222 is extended between the two supporting members 221. Accordingly, the two sliding slots 225 are formed at the inner sides of the supporting members 221 and are facing toward each other. Therefore, the decorative panel 31 is detachably coupled between the supporting members 221 when two side edge portions of the decorative panel 31 are slidably engaged with the sliding slots 225, so as to overlap the decorative panel 31 with the decorative face 223 of the supporting panel 222. The decorative sleeves 32 can also detachably enclose the supporting members 211 respectively. Preferably, the decorative panel 31 is overlapped with a rear side of the supporting panel 222.

Figure 7:
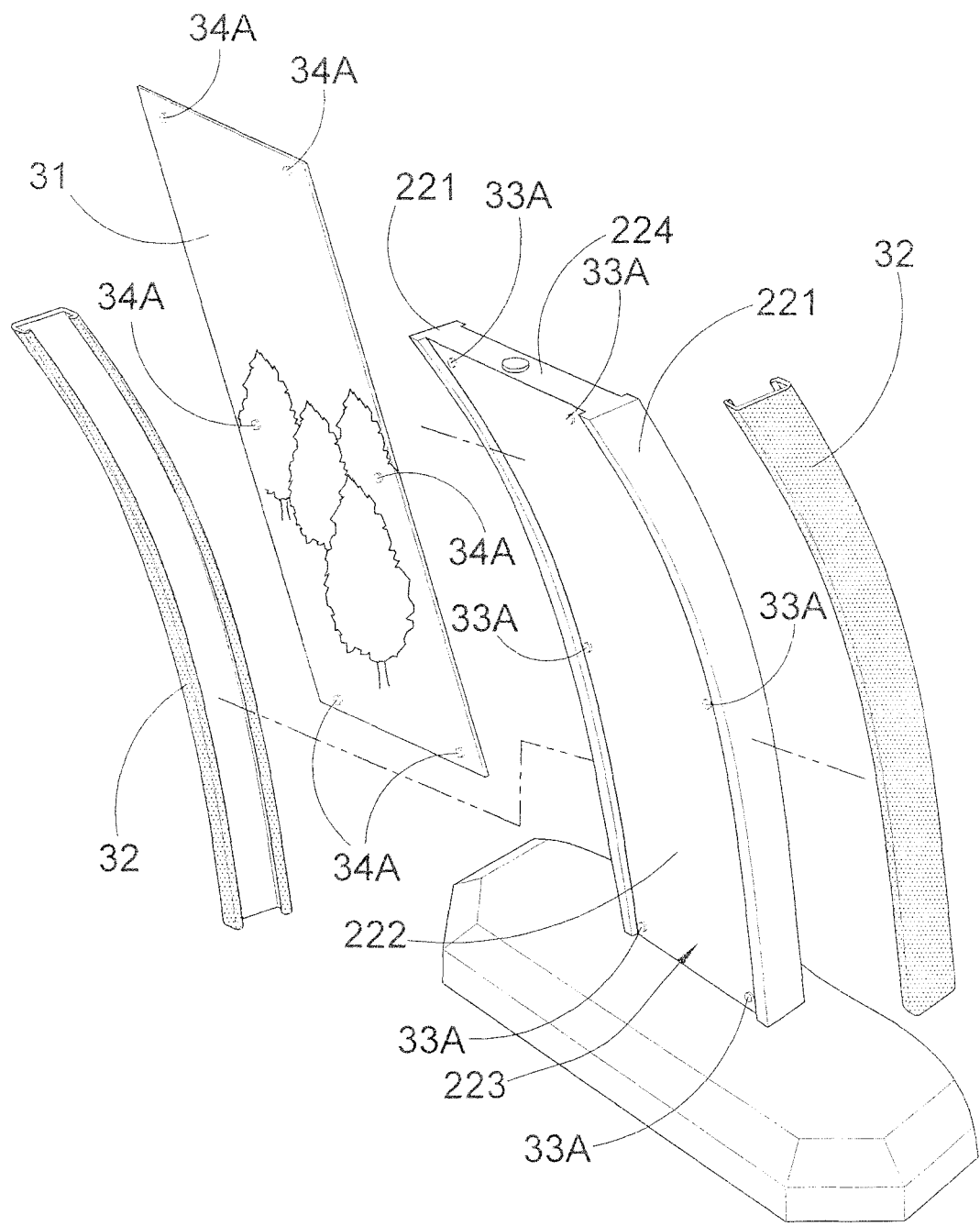
FIG. 7 illustrates a magnetic engagement method of the decorative element according to the above preferred embodiment of the present invention.

For the magnetic engagement method, as shown in FIG. 7, the decorative elements 31 are detachably and magnetically attached on the decorative faces 223 of the supporting panels 222 respectively. Accordingly, a plurality of first magnetic elements 33A spacedly formed at the decorative face 223 of each of the supporting panels 222, and a plurality of second magnetic elements 34A spacedly formed at each of the decorative panels 31, such that the first and second magnetic elements 33A, 34A are magnetically attracted with each other to detachably overlap the decorative panel 31 on the decorative faces 223 of the supporting panels 222 respectively. Preferably, the first magnetic elements 33A are spacedly formed at the decorative face 221 of each of the supporting panels 22 at a peripheral portion thereof. The second magnetic elements 34A are spacedly formed at each of the decorative panels 31 at a peripheral portion thereof. Therefore, each of the decorative panels 31 is encircled within the two supporting members 221, the base 23, and the top support 225. It should be appreciated that the decorative panel 31 can be detachably overlapped on the supporting panel 222 of the back supporting frame of the chair by magnetic engagement.

Figure 8:
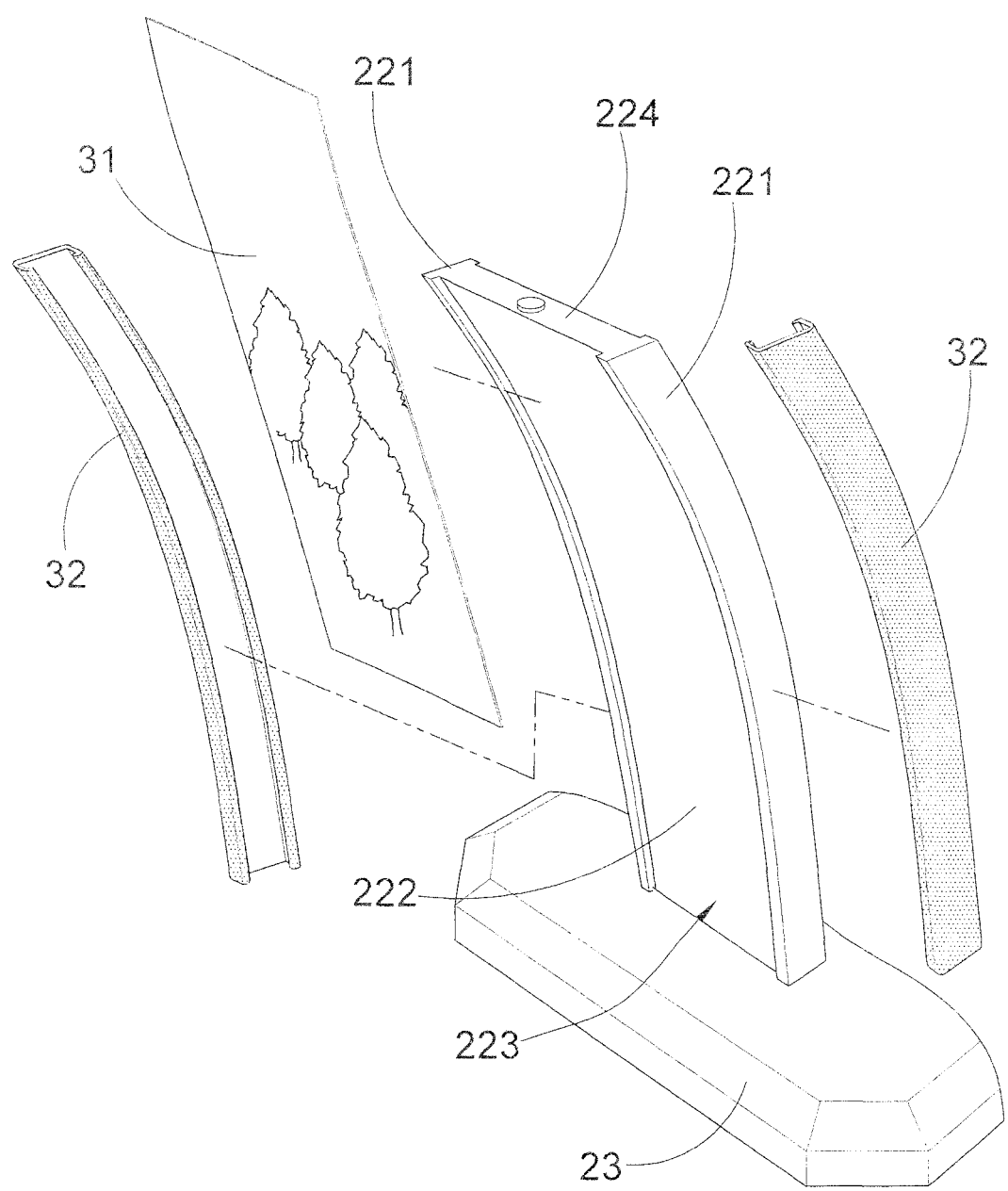
FIG. 8 illustrates a static cling method of the decorative element according to the above preferred embodiment of the present invention.

For the static cling method, as shown in FIG. 8, the decorative elements 31 are detachably attached on the decorative faces 223 of the supporting panels 222 respectively by means of static cling. Accordingly, each of the decorative panel 31 is made from a thin plastic film that clings to the decorative face 223 of the supporting panel 222 with static electricity. Each of the decorative panel 31 is free of adhesive and is easily to be removed, repositioned and reused. It should be appreciated that the decorative panel 31 can be detachably overlapped on the supporting panel 222 of the back supporting frame of the chair by means of static cling.

According to the preferred embodiment, each of the decorative sleeves 32 forms a frame cover not only to decorate the supporting member 221 but also to protect the supporting member 221. Each of the decorative sleeves 32 is made of flexible material to fit the supporting member 221 thereat. Preferably, each of the decorative sleeves 32 has a C-shaped cross section, such that when the supporting member 221 is received in the decorative sleeve 32, the outer side, the front side, and the rear side of the supporting member 221 are covered by the decorative sleeve 32. Each of the decorative sleeves 32 has its own design and/or decorative pattern which can mix and match with the decorative elements 31, wherein the sliding slots 225 are exposed when the supporting members 221 are received in the decorative sleeves 32 respectively.

In order to change the overall ornamental design of the furniture product, the consumer is able to remove the utilizing unit 21 from the main supporting frame 22. The user is able to select one of the different kinds of the decorative panels 31 in order to couple the decorative panel 31 between the supporting members 221 Therefore, the decorative panel will be retained between the supporting members 21 and spacedly overlapped with the supporting panel 222. The consumer is also able to detachably attach the decorative sleeves 32 at the supporting members 221 respectively to enhance the decorative effect of the furniture produce. Throughout the decorative process, the consumer does not need to disassemble the main supporting frame 22, such as detaching the supporting panel 222 from the supporting members 221 or detaching the supporting members 221 from the base 23. The consumer is able to change the decorative panel 31 and/or the decorative sleeves 32 from the main supporting frame 22 by removing the original decorative panels 31 and/or the original decorative sleeves 32 from the main supporting frame 22 and re-attaching other decorative elements 31 and/or other decorative sleeves 32 to the main supporting frame 22. Therefore, no disassembling process is required for the main supporting frame 22 to interchange the decorative panels 31 and/or the decorative sleeves 32. As a result, the decorative effect of the chair will match with the table to form a table set. In other words, the user is able to change an overall ornamental design of the table set by interchanging the decorative panels 31 and/or the decorative sleeve 32 to table and chair. It is worth mentioning that the decorative panels 31 and the decorative sleeve 32 not only enhance the aesthetic appearance of the furniture but also protect the furniture from scratching. The decorative panels 31 and the decorative sleeve 32 can be made of waterproof or fire proof material to prolong the life span of the furniture product.

According to the preferred embodiment, the furniture accessory database 30 contains images of different light (LED) arrangements 60 as the decorative elements to be detachably coupled at the non-utilizing surface of the furniture product for adding decorating and illuminating functions of the furniture product, wherein the images of the light arrangements are stored in the furniture accessory database 30.

Figure 10:
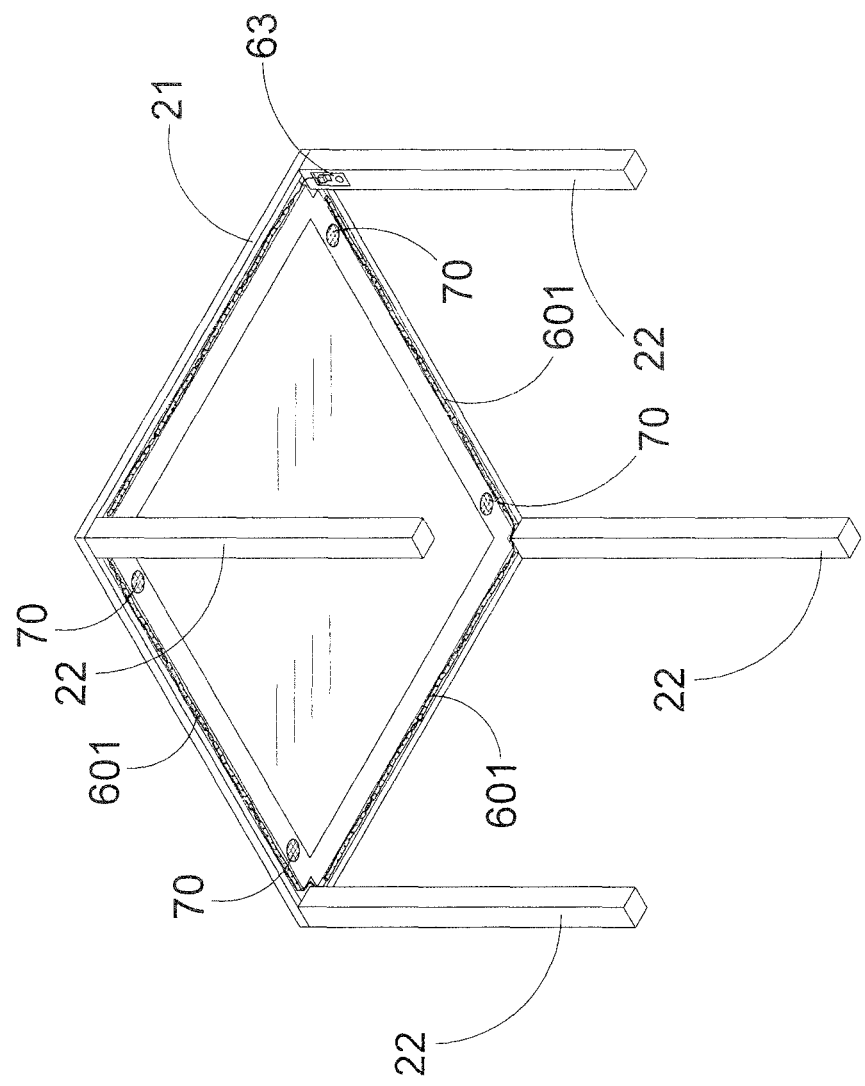
FIG. 10 is a bottom perspective view of the furniture product with a light arrangement according to the above preferred embodiment of the present invention, illustrating the light arrangement embedded into the bottom surface of a table.
Figure 11:
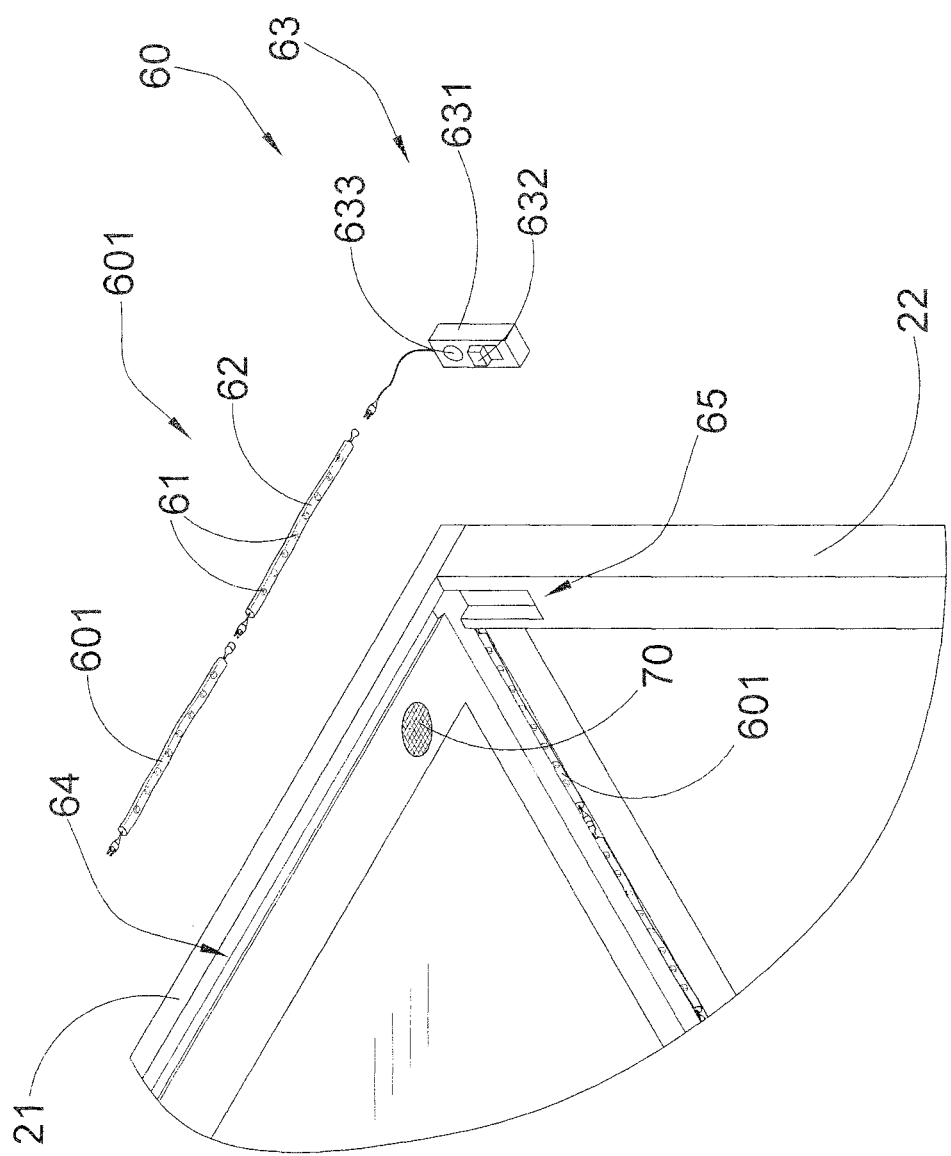
FIG. 11 is a perspective view of the light arrangement according to the above preferred embodiment of the present invention.
Figure 12:
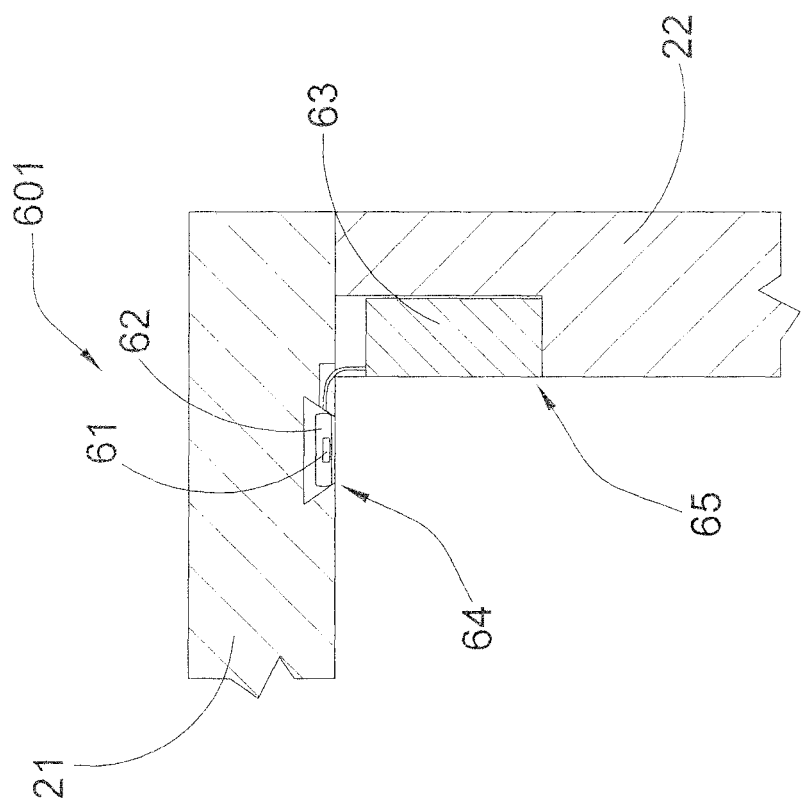
FIG. 12 is a sectional view of the light arrangement according to the above preferred embodiment of the present invention, illustrating the light string fitted into the supporting groove at the bottom surface of the furniture product.

As shown in FIGS. 10 to 12, each of the light arrangements 60 comprises a plurality of LEDs 61 embedded in the non-utilizing surface of the furniture product for generating a light effect thereat. Accordingly, since the LEDs 61 are electrically linked with each other and are embedded in the non-utilizing surface of the furniture product, the consumer will normally not touch or reach the LEDs 61 during the normal use of the furniture product. The light arrangement 60 further comprises a flexible light casing 62 sealedly receiving the LEDs 61 therein to form a light string 601 being embedded in the non-utilizing surface of the furniture product. Accordingly, the flexible light casing 62 is a flat and elongated tape shaped casing 62, wherein the LEDs 61 are aligned with and sealed in the light casing 62. Preferably, each of the LEDs 61 is a diode sealed in the light casing 62 to minimize the thickness of the light casing 62. Therefore, the light string 601 can be flattened and embedded in the non-utilizing surface of the furniture.

According to the preferred embodiment, two or more light strings 601 are formed and are electrically linked with each other end-to-end. Depending on the size and shape of the non-utilizing surface of the furniture product, the light strings 601 can be bent and extended to fit at the non-utilizing surface of the furniture product. The consumer is able to replace one of the light strings 601 if the corresponding light string 601 is malfunctioned.

Accordingly, the step (3) further comprises the following steps.

Figure 13:
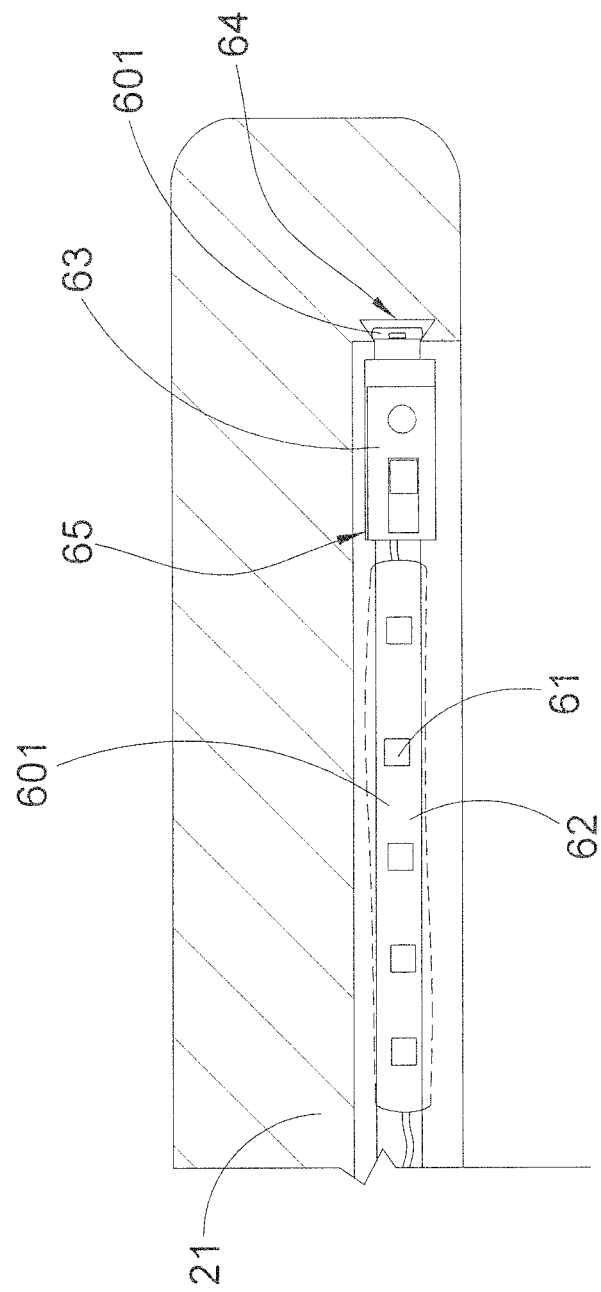
FIG. 13 illustrates an alternative mode of the light arrangement according to the above preferred embodiment of the present invention, illustrating the light string fitted into the supporting groove at the inner rim surface of the furniture product.

(3.2') Select a desired location of the lighting arrangement 60 on the non-utilizing surface of the furniture product. Accordingly, the lighting arrangement 60 can be provided at the bottom surface of the utilizing unit 21 at the peripheral portion thereof, as shown in FIGS. 11 and 12. Alternatively, the lighting arrangement 60 can be provided at an inner rim surface of the surrounding rim of the utilizing unit 21, as shown in FIG. 13, wherein the inner rim surface of the surrounding rim also serves as the non-utilizing surface of the furniture product.

(3.3') Form at least a supporting groove 64 indented on the non-utilizing surface that the light string 601 is received in the supporting groove 64. Accordingly, the supporting groove 64 indented on the non-utilizing surface of the furniture product that the LEDs 61 are received in the supporting groove 64. In particular, the light string 601 is received in the supporting groove 64 to retain the LEDs 61 at the non-utilizing surface of the furniture product. It is worth mentioning that the supporting groove 64 is pre-formed on the non-utilizing surface of the furniture product to guide the light strings 601 to be mounted thereon. Accordingly, the light strings 601 can be mounted to the non-utilizing surface of the furniture product without any tool or adhesive. As shown in FIG. 12, the supporting groove 64 has a dovetail shape defining an enlarged groove cavity and a narrowed groove opening for receiving the light string 601. A width of the narrowed groove opening is slightly smaller than a size of the light string 601. Therefore, the light string 601 can be pushed into the groove cavity of the supporting groove 64 through the narrowed groove opening in order to securely retain the light string 601 along the supporting groove 64. The light string 601 can be pulled out of the groove cavity of the supporting groove 64 in order to detach the light string 601 from the supporting groove 64. Preferably, the groove cavity has a flat surface to engage with the light string 601 so as to align the LEDs 61 with the narrowed groove opening of the supporting groove 64. Preferably, the light string 601 is embedded in the non-utilizing surface of the furniture product to form a flat non-protruding surface. In other words, a depth of the supporting groove 64 must be equal to or larger than the thickness of the light string 601. Therefore, the light string 601 will be hidden and will not be protruded out of the non-utilizing surface of the furniture product.

Accordingly, the supporting groove 64 can be indented at the bottom side of the table such that the light string 601 is mounted underneath the tabletop. Alternatively, the supporting groove 13 can be indent at the inner rim surface of the surrounding rim to receive the light string 601 thereat. Therefore, the consumer is able to select the desired location of the lighting arrangement 60 on the non-utilizing surface of the furniture product.

According to the preferred embodiment, the light arrangement 60 further comprises a control module 63 supported at the non-utilizing surface of the furniture product for controlling the LEDs 61. The control module 63 comprises a battery compartment 631 for receiving a battery therein to electrically link to the LEDs 61, and a control panel 632 provided on the battery compartment 631 to selectively control light effect and operation of the LEDs 61. Accordingly, the consumer is able to switch on and off the LEDs 61 via the control panel 632 and select different light effects such as different colors and/or flash patterns via the control panel 632.

As shown in FIGS. 11 and 12, at least a receiving cavity 65 is formed at the non-utilizing surface of the furniture product to receive the control module 63 thereat. Preferably, the receiving cavity 65 is formed at one of the leg frames of the table at the inner side thereof, such that the control module 63 is hidden under the tabletop. However, the consumer is able to access the control module 63 easily. Preferably, a communication slot is formed at the furniture body 10 to communicate the supporting groove 64 with the receiving cavity 65, wherein a connection cable is extended from the control module 63 to the light string 601 through the communication slot.

Figure 14:
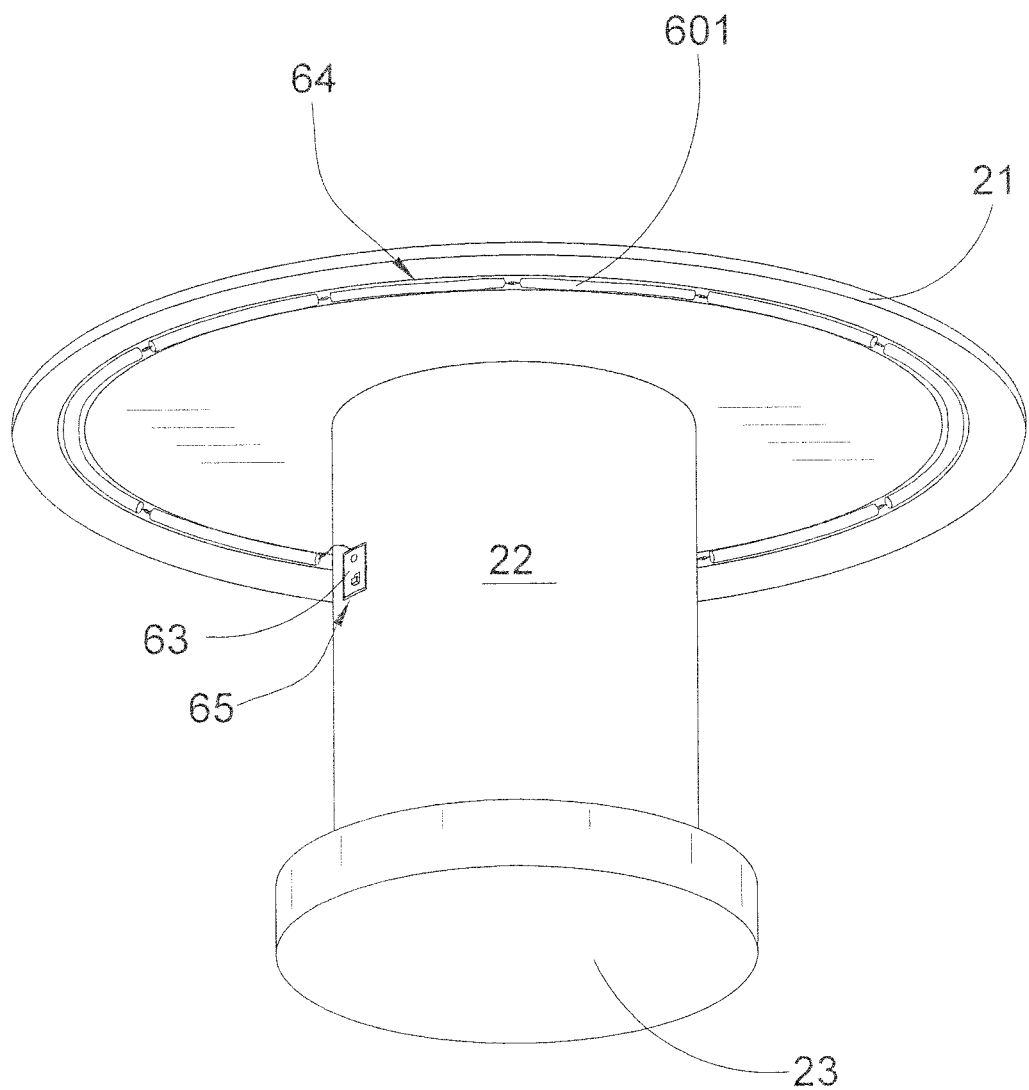
FIG. 14 is a perspective view of an alternative mode of the furniture according to the above preferred embodiment of the present invention, illustrating the circular shaped furniture product.

It is worth mentioning that the furniture product can be configured to have different shapes. For example, the tabletop of the utilizing unit 21 is formed in circular shape and the leg frame of the main supporting frame 22 is downwardly extended from the center of the tabletop, as shown in FIG. 14. Accordingly, the supporting groove 64 is indent at the bottom surface of the tabletop to receive the light string 601 thereat. It is worth mentioning that the receiving cavity 65 is formed at the outer surface of the leg frame, such that the control module 63 is received in the receiving cavity 65 at the outer surface of the leg frame.

Figure 15:
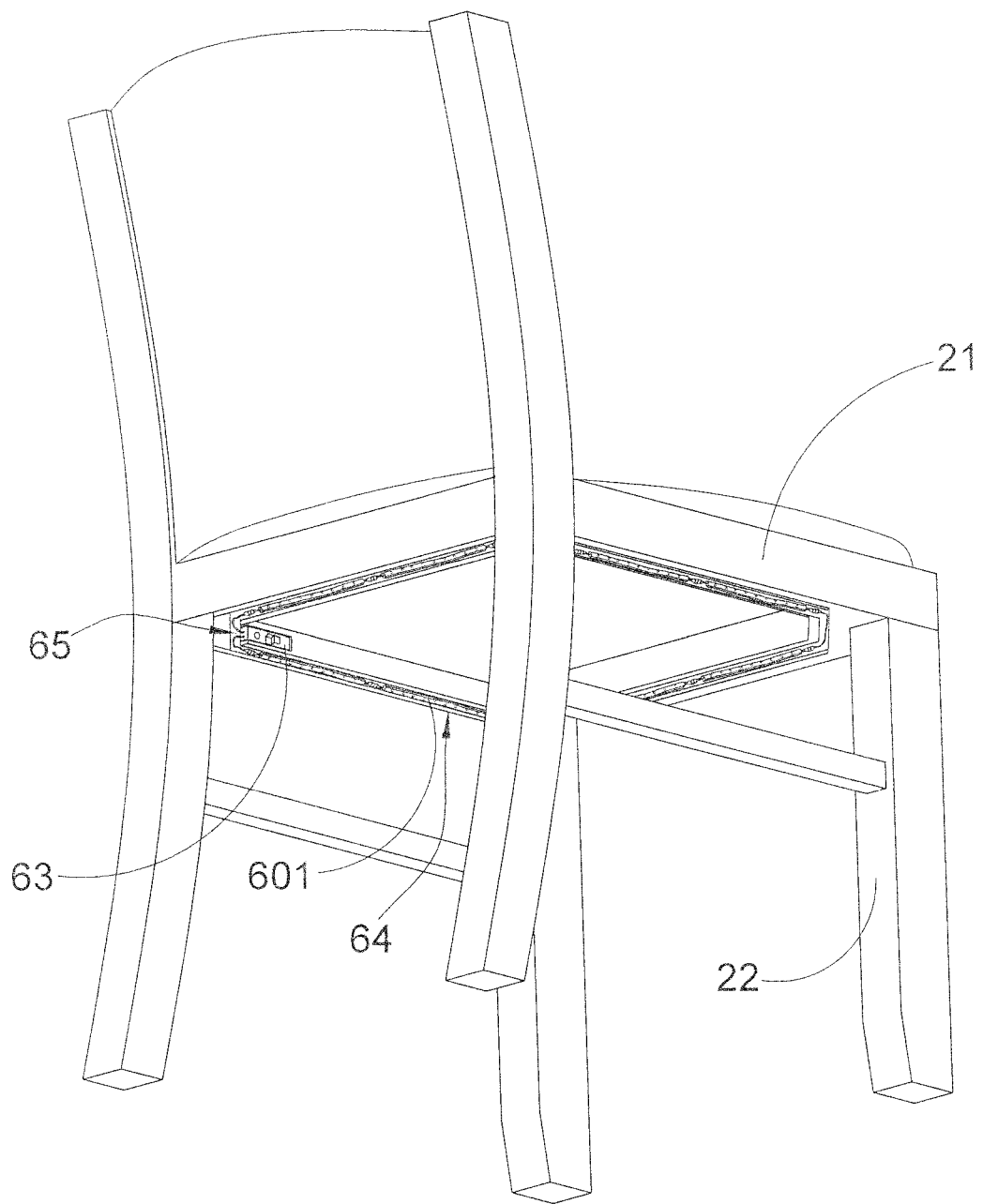
FIG. 15 is perspective view of an alternative mode of the furniture product, illustrating the furniture product being embodied as a chair with the light arrangement.

For chair configuration, the supporting groove 64 is indent at the bottom surface of the sitting panel to receive the light string 601 thereat, as shown in FIG. 15. It is worth mentioning that the receiving cavity 65 is also formed at the bottom surface of the sitting panel, such that the control module 63 is received in the receiving cavity 65 at the bottom surface of the sitting panel.

(3.4') Select an environmental sensor 633 operatively linked to the light string 601 to selectively activate the LEDs 61, wherein the environmental sensor 633 is selected from a group consisting of motion sensor and light sensor to selectively activate the LEDs 61. In particular, the environmental sensor 633 operatively linked to the control module 63 to control an operation of the light string 601. For example, when dining, the user' legs extend under the tabletop, such that the motion sensor will detect the motion to activate the LEDs 61. Likewise, the light sensor will activate the LEDs 61 when an ambient light intensity under the tabletop is below a predetermined threshold.

According to the preferred embodiment, the furniture accessory database 30 contains images of audio modules 70 stored in the furniture accessory database 30 and built-in with the furniture product, as shown in FIGS. 10 and 11. The audio module 70, as a built-in sound system, comprises a speaker unit built-in at the non-utilizing surface of the furniture product for generating an audio sound as an additional function for the furniture product. Accordingly, the consumer is able to wirelessly link the portable music player to audio module 70, by "Bluetooth" or "Wi-Fi" for transmitting the audio signal to the audio module 70. The portable music player can also be connected to the audio module 70 via an auxiliary input thereof.

It is appreciated that FIGS. 3 to 9 show the configurations of the decorative panels 31 and the decorative sleeve 32 while FIGS. 10 to 15 show the configurations of the light arrangements 60 and the audio module 70. In particular, the decorative panels 31, the decorative sleeve 32, the light arrangements 60, and the audio module 70 are selectively combined to be added to the furniture product. In other words, the consumer is able to select and design the furniture product with one or more accessories of the decorative panels 31, the decorative sleeve 32, the light arrangements 60, and the audio module 70.

According to the preferred embodiment, the computerized module 40 is arranged for generating a preview of a virtual furniture product with the selected decorative elements on the furniture customizing platform 10. The consumer is able to change different utilizing units 21, different main supporting frames 22, different decorative panels 31, different decorative sleeve 32, different light arrangements 60, and/or different audio modules 70, wherein the computerized module 40 will instantly generate a preview of the virtual furniture product. Therefore, the virtual furniture product with the selected decorative elements will be displayed on a screen of the consumer's computer.

According to the preferred embodiment, the furniture designing system further comprises an instruction center 80 containing an assembling instruction and an interchangeable instruction. The method of the present invention further comprises the following steps.

(5) Provide the assembling instruction on the furniture customizing platform 10 to illustrate the assembling operation between the main supporting frame 22 and the utilizing unit 21.

(6) Provide the interchangeable instruction on the furniture customizing platform 10 to illustrate the interchanging operation of the decorative elements without disassembling the furniture product.

The assembling instruction and the interchangeable instruction are preferably shown as an animation on the furniture customizing platform 10 to show the consumer how to assemble the furniture product with the selected decorative elements. It is worth mentioning once the furniture product is assembled, the consumer can always interchange the decorative elements without disassembling the furniture product.

The present invention further comprises a registering step and a purchasing step. The registering step is a step of registering to the control center 101, wherein personal information of the consumer is input to the control center 101. Accordingly, limited personal information of the consumer, such as name and contacting information, will be input to the control center 101. Once the consumer registers to the control center 101, the consumer will become a member of the control center 101, wherein the member is able to place any order to the control center 101.

The purchasing order is processed at the purchasing step and is completed by the member to the control center 101 through Internet, wherein the purchasing order must include one or more designated furniture products and/or the selected decorative elements selected from the furniture component database 20 and/or the furniture accessory database 30, and quantity of each of the designated furniture products and/or the selected decorative elements. In particular, the consumer is able to place the purchasing order in one single action, such as one click of mouse or one touch on a touch screen of any computer, to include all the furniture product with the selected decorative elements displayed as the preview of the virtual furniture product with the selected decorative elements on the furniture customizing platform 10. In other words, once the consumer views the preview of the virtual furniture product with the selected decorative elements on the furniture customizing platform 10, the purchasing order can be placed to complete the purchasing transaction. It is worth mentioning that payment method and billing information of the consumer will be input into the control center 101 in order to complete the purchasing order.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A furniture system, comprising:
a furniture product which is a table constructed by one of a plurality of tabletops, one of a plurality of main supporting frames, at least one of a plurality of decorative panels and at least one of a plurality of decorative sleeves, wherein said tabletop is coupled to said main supporting frame, wherein said decorative panels are interchangeable and are detachably coupled to said main supporting frame below said tabletop without disassembling said main supporting frame from said tabletop, wherein said main supporting frame comprises a plurality of supporting members formed in pair as a pair of leg frames of said table, wherein said decorative panels are detachably coupled between each pair of said leg frames, wherein said decorative sleeves are interchangeable and are detachably coupled to said main supporting frame without disassembling said main supporting frame from said tabletop; and
a furniture customizing system which comprises:
a server adapted for being accessed by a consumer's electronic device through Internet;
a furniture component database containing a plurality of images of said tabletops, said main supporting frames, said decorative panels and said decorative sleeves, wherein said images are adapted for being selected through said server via the consumer's electronic device; and
a furniture customizing platform displaying said selected images of a tabletop, a main supporting frame, a decorative panel and a decorative sleeve, and creating an overall ornament image of said furniture product with said selected images of said tabletop, said main supporting frame, said decorative panel and said decorative sleeve, wherein said overall ornament image of said furniture product is adapted to be modified and displayed on said furniture customizing platform when at least one of said images of said tabletop, said main supporting frame, said decorative panel and said decorative sleeve is selected to replace said selected image, such that said furniture product is customized and manufactured corresponding to said overall ornament image of said furniture product with said selected images of said tabletop, said main supporting frame, said decorative panel and said decorative sleeve, wherein said main supporting frame further comprises a supporting panel coupled between each pair of said supporting members to define a decorative face at said supporting panel, wherein said decorative panel is coupled at said decorative face of said supporting panel, wherein said decorative sleeve has a cavity that each of said supporting members is enclosed within said cavity of said decorative sleeve, wherein said furniture component database contains images of said leg frames and said supporting panels for being selected, wherein said overall ornament image of said furniture product is displayed with said selected images of said leg frames, said supporting members, said decorative panel and said decorative sleeve.

2. The furniture system, as recited in claim 1, wherein each pair of said supporting members are parallel with each other and are extended in a curve configuration, wherein said decorative panel is made of flexible material to match with a curvature of said supporting members.

3. The furniture system, as recited in claim 1, wherein said decorative panel is coupled at said decorative face of said supporting panel via one of interchangeable configurations which are slidable configuration, magnetic engagement configuration, and a static cling configuration, wherein one of said interchangeable configurations are selected through said furniture customizing platform to customize and manufacture said furniture product.

4. The furniture system, as recited in claim 3, wherein said furniture product further comprises a plurality of different light arrangements each comprising a plurality of LEDs and a flexible light casing sealedly received in said LEDs therein to form a light string being embedded in a non-utilizing surface of said furniture product, wherein said furniture component database further contains a plurality of images of said light arrangements to be selected for customizing said furniture product.

5. The furniture system, as recited in claim 4, wherein said furniture product further comprises a plurality of different environmental sensors operatively linked to said light string to selectively activate said LEDs, wherein said environmental sensors are selected from a group consisting of motion sensor and light sensor to selectively activate said LEDs, wherein said furniture component database further contains a plurality of images of said environmental sensors to be selected for customizing said light string.

* * * * *